United States Patent
Ueda

(10) Patent No.: US 7,875,251 B2
(45) Date of Patent: Jan. 25, 2011

(54) OZONE-DECOMPOSING AGENT

(75) Inventor: Kazuhiro Ueda, Ohtsu (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 339 days.

(21) Appl. No.: 11/914,120

(22) PCT Filed: Apr. 25, 2006

(86) PCT No.: PCT/JP2006/308603

§ 371 (c)(1),
(2), (4) Date: Jun. 10, 2008

(87) PCT Pub. No.: WO2006/120885

PCT Pub. Date: Nov. 16, 2006

(65) Prior Publication Data

US 2009/0044504 A1    Feb. 19, 2009

(30) Foreign Application Priority Data

May 9, 2005 (JP) .............................. 2005-135889

(51) Int. Cl.
*B01D 53/66* (2006.01)
(52) U.S. Cl. .................. 422/177; 502/329; 502/338; 502/331; 502/324
(58) Field of Classification Search .............. 55/524; 502/423, 324, 325, 338, 331, 329; 422/177
See application file for complete search history.

(56) References Cited

U.S. PATENT DOCUMENTS 5,002,920 A    3/1991   Yoshimoto et al.

FOREIGN PATENT DOCUMENTS

| CN | 1465427 A | 1/2004 |
|---|---|---|
| JP | 56-168824 | 12/1981 |
| JP | 57-027903 A | 2/1982 |
| JP | 59-042022 A | 3/1984 |
| JP | 62-201648 | 9/1987 |
| JP | 2-187148 | 7/1990 |
| JP | 03-193117 A | 8/1991 |
| JP | 04-104840 A | 4/1992 |
| JP | 05-309232 A | 11/1993 |
| JP | 07-308573 A | 11/1995 |
| JP | 2002-233718 A | 8/2002 |

OTHER PUBLICATIONS

D. Mehandjiev et al.—"Ozone decomposition, benzene and CO oxidation over $NiMnO_3$-ilmenite and $NiMn^2O^4$-spinel catalysts," Applied Catalysis A:General 206, 2001, pp. 13-18.
International Search Report, dated May 23, 2006.

*Primary Examiner*—Duane Smith
*Assistant Examiner*—Tiffany N Palmer
(74) *Attorney, Agent, or Firm*—Morrison & Foerster LLP

(57) ABSTRACT

An ozone-decomposing agent including a first iron compound and a second iron compound is provided. The second iron compound may have a spinel type structure. The first iron compound of the ozone-decomposing agent may include an oxide selected from $Fe_2O_3$, $FeO(OH)$ or $Fe(OH)_3$. The second iron compound of the ozone-decomposing agent may include an oxide selected from $MnFe_2O_4$, $ZnFe_2O_4$, $NiFe_2O_4$, $CuFe_2O_4$ or $CoFe_2O_4$.

5 Claims, No Drawings

OZONE-DECOMPOSING AGENT

REFERENCE TO RELATED APPLICATIONS

This application is a national stage application under 35 USC 371 of International Application No. PCT/JP2006/308603, filed Apr. 25, 2006, which claims priority from Japanese patent application No. 2005-135889, filed May 9, 2005, the entire contents of which are incorporated herein by reference.

FIELD OF THE INVENTION

The present invention relates to an ozone-decomposing catalyst which decomposes to remove ozone ($O_3$) present in the air.

BACKGROUND OF THE INVENTION

In an electric dust collecting-type air cleaning machine or an electrophotography copying machine employing an electrification method by corona discharge, since corona discharge is performed in the air in the machine, a large amount of ozone is generated in the machine. Since this ozone is a gas having a very strong odor and high oxidativeness and, for example, only due to the presence of a concentration of 0.1 ppm in the air, causes the physiological action such as breath shortness, dizziness, nausea and headache, leakage of such the ozone to the outside of an each instrument must be avoided.

In order to overcome such problems, various filters decomposing ozone are proposed. There are a variety of forms and, when an attention is paid to an ozone-decomposing agent, there are following:

First, an ozone-decomposing agent in which a pore volume of activated carbon is controlled has been disclosed (e.g. see Patent Document 1).

However, there is a problem that, even when a pore volume of activated carbon is controlled, since decomposition is a carbon losing reaction, a deterioration rate of carbon becomes great with time, and a high efficacy can not be maintained over a long period of time.

Further, an ozone-decomposing agent in which α-FeOOH and $5Fe_2O_3 \cdot H_2O$ are carried on a surface of activated carbon has been disclosed (e.g. see Patent Document 2).

Such procedure is an activated carbon-dependent decomposition reaction, and can maintain a higher efficacy than that of single activated carbon, but there is also a problem that a deterioration rate becomes great with time and a high efficacy can not be maintained over a long period of time.

On the other hand, various ozone decomposing agents derived from an iron-copper composite oxide have been disclosed (e.g. see Patent Documents 3 and 4).

However, since a composite compound of iron oxide and copper oxide is insufficient in the ozone-decomposing performance capability, the ozone-decomposing performance capability is improved by using a noble metal jointly, and a catalyst therefore becomes extremely expensive, resulting in difficulty in wide industrial utilization.

Patent Document 1: Japanese Patent Application Laid-Open (JP-A) No. 56-168824
Patent Document 2: JP-A No. 2002-233718
Patent Document 3: JP-A No. 62-201648
Patent Document 4: JP-A No. 02-187148

SUMMARY OF THE INVENTION

An ozone-decomposing agent including a first iron compound and a second iron compound is provided. The second iron compound may have a spinel type structure. The first iron compound of the ozone-decomposing agent may include an oxide selected from $Fe_2O_3$, FeO(OH) or $Fe(OH)_3$. The second iron compound of the ozone-decomposing agent may include an oxide selected from $MnFe_2O_4$, $ZnFe_2O_4$, $NiFe_2O_4$, $CuFe_2O_4$ or $CoFe_2O_4$.

DETAILED DESCRIPTION OF THE INVENTION

The present invention was done under the background of the aforementioned problem of the prior art. An objective of the present invention is to provide an ozone-decomposing agent which exhibits high performance capability for the removal of ozone or another gas being harmful to a human body, has a long life and can be produced at a low cost.

In order to solve the above problems, the present inventors intensively studied and, as a result, finally completed the present invention. That is, the present invention relates to an ozone-decomposing agent containing an iron compound and an iron compound having a spinel type structure.

The ozone-decomposing agent in which the iron compound comprises at least one oxide of $Fe_2O_3$, FeO(OH) and $Fe(OH)_3$, and the iron compound having a spinel type structure comprises at least one oxide of $MnFe_2O_4$, $ZnFe_2O_4$, $NiFe_2O_4$, $CuFe_2O_4$, and $CoFe_2O_4$ is suitable for the above objective.

The ozone-decomposing agent containing an iron compound and an iron compound having a spinel type structure enables to exert the satisfactory ozone removal performance capability over a long term, at the low price.

It is preferable that the present invention is an ozone-decomposing agent containing both of an iron compound and an iron compound having a spinel type structure. This is because an excellent ozone-decomposing performance capability is obtained by inclusion of both of an iron compound and an iron compound having a spinel type structure. The reason why the excellent ozone-decomposing performance capability is obtained by such a combination is not clear, but it is presumed that inclusion of both of them smoothly performs uptake and discharge of an oxygen atom of ozone.

It is preferable that the iron compound in the present invention comprises at least one oxide of $Fe_2O_3$, FeO(OH), and $Fe(OH)_3$. By employing these iron compounds in conjunction with the presence of an iron compound having a spinel type structure, the more excellent ozone-decomposing performance capability is exerted. The iron compound can be produced by a method of neutralizing a water-soluble iron salt with ammonium carbonate, sodium hydrogen carbonate, sodium carbonate or the like, and firing this at a high temperature, a method of neutralizing a water-soluble iron salt with ammonium carbonate, sodium hydrogen carbonate, sodium carbonate or the like and, thereafter, in water-oxidizing it with an oxidizing agent such as potassium peroxybisulfate, sodium hypochlorite, aqueous hydrogen peroxide and the like, a method of neutralizing a water-soluble iron salt with ammonium carbonate, sodium hydrogen carbonate, sodium carbonate or the like and, thereafter, aerating a solution with the air to in water-oxidize it with dissolved oxygen, or a method of firing a water soluble iron salt at a high temperature.

On the other hand, it is preferable that the iron compound having a spinel type structure comprises at least one oxide of $MnFe_2O_4$, $ZnFe_2O_4$, $NiFe_2O_4$, $CuFe_2O_4$, and $CoFe_2O_4$. The iron compound having a spinel type structure can be produced by a method of mixing powders of oxide and carbonate of respective metals, and performing heating synthesis at a high temperature of 800° C. or more, a method of co-precipitating respective metals of Fe, Ni, Co and Mn as oxalate, and heating the precipitate at 600 to 800° C., or a method of neutralizing a water-soluble metal salt with ammonium carbonate, sodium hydrogen carbonate, sodium carbonate or the like, heating it to 40 to 80° C. while a reaction solution is aerated with a nitrogen gas, retaining it at a constant temperature, and changing the nitrogen gas with the air to oxidize it with dissolved oxygen with stirring.

There is a method of individually producing an iron compound and an iron compound having a spinel type structure by the above method, and mixing them. However, in order to rationally produce an iron compound and an iron compound having a spinel type structure, a method of producing an iron compound and an iron compound having a spinel type structure by a co-precipitation method is preferable.

More specifically, the method comprises neutralizing a water-soluble metal salt with ammonium carbonate, sodium hydrogen carbonate, sodium carbonate or the like, heating it to 40 to 80° C. while the reaction solution is aerated not with nitrogen but with the air, retaining it at a constant temperature, and oxidizing this with dissolved oxygen with stirring. Further, it is also possible to proceed oxidation of $FeOOH$, $Fe(OH)_3$ or the like by firing at 200 to 400° C. It is contemplated that this method produces an iron compound on a low temperature side of not higher than 40° C., and produces an iron compound having a spinel type structure at a temperature of not lower than 40° C.

A content of manganese, zinc, nickel, copper or cobalt to be contained in the ozone-decomposing catalyst is preferably 3 to 50 mole %, more preferably 10 to 30 mole % based on an iron element of the ozone-decomposing catalyst. If the content is less than 3 mole %, a production rate of a spinel type structure is reduced, and the ozone-decomposing performance capability is reduced. On the other hand, if the content exceeds 50 mole %, production of a compound derived from manganese, zinc, nickel, copper or cobalt is increased, and the ozone-decomposing performance capability is reduced.

A structure of the iron compound or the iron compound having a spinel type structure can be confirmed by X-ray diffraction. On the other hand, regarding iron, manganese, zinc, nickel, copper or cobalt contained in the ozone-decomposing catalyst, a content of a metal element such as manganese, zinc, nickel, copper or cobalt can be confirmed by fluorescent X-ray.

The ozone-decomposing catalyst containing the iron compound and the iron compound having a spinel type structure can be not only used alone in a filler layer by molding into a powder or a pellet, but also can be used by mixing with or jointly using other deodorizing agent or decomposing agent. Alternatively, the catalyst can be used by applying to a non-woven fabric, a woven fabric and a sheet substrate, and molding and processing into a pleats shape or a honeycomb shape. Furthermore, the catalyst can be used by applying to a sheet, a honeycomb substrate consisting of an aluminum foil, and urethane.

EXAMPLES

The action and the effect of the present invention will be shown more specifically below by way of Examples. The following Examples do not limit the present method, and any of design and change in line with the aforementioned or below-mentioned gist is included in the technical scope of the present invention.

First, a method of testing an ozone-decomposing agent used in the present Examples will be shown below.

(Spinel Structure)

The iron compound and the iron compound having a spinel type structure can be confirmed by measuring a lattice spacing with X-ray diffraction (d value). The measuring conditions were a ray source of $CuK\alpha$, a voltage of 40 KV, a current of 37.5 mA, a scanning range of 15 to 75°, and a scanning rate of 0.124°/min. The compounds can be confirmed from the lattice spacing by comparing measurement results with JCPDS (Joint Committee of Powder Diffraction Standards) cards. For example, a d value of $MnFe_2O_4$ is 2.56, 1.50, 3.01, 1.64 etc. from a higher relative intensity order.

(Ozone Removal Rate)

The ozone-decomposing agent was weighed (0.1 g), and filled into a glass column of an inner diameter of 12.5 mm. The air containing 8 ppm ozone, which had been adjusted to a temperature of 25° C., and a relative humidity of 50% RH, was supplied to a column at a flow rate of 2 L/min. An ozone concentration at an inlet and an outlet of the column was measured, and a removal rate was calculated from the following equation. An ozone concentration was measured with an ultraviolet-ray absorbing method ozone concentration measuring device.

(Mathematics 1)

$$\text{Removal rate}(\%) = [1 - (\text{ozone outlet concentration})/(\text{ozone inlet concentration}) \times 100]$$

Example 1

In 500 ml of ion-exchanged water at 20° C. were dissolved 5.5 g of iron sulfate [$FeSO_4 \cdot 7H_2O$], and 1.2 g of manganese sulfate [$MnSO_4 \cdot 5H_2O$] to obtain an A solution. Separately, 8 g of sodium carbonate [$Na_2CO_3$] was dissolved in 500 ml of ion-exchanged water at 20° C. to obtain a B solution. To the A solution was slowly added the B solution to obtain a C solution containing an iron compound. This C solution was stirred for 1 hour while the solution was aerated with the air. Thereafter, a temperature of the solution was elevated to 50° C., followed by stirring for 6 hours. The C solution was filtered, washed with ion-exchanged water until the filtrate was neutralized, and dried for 10 hours in the air at 100° C. The resulting catalyst contained an iron compound of $Fe_2O_3$ and $FeO(OH)$, and an iron compound having a spinel type structure of $MnFe_2O_4$, and a Mn element rate was 20 mole %.

Example 2

In 500 ml of ion-exchanged water at 20° C. were dissolved 5.5 g of iron sulfate [$FeSO_4 \cdot 7H_2O$], and 1.2 g of copper sulfate [$CuSO_4 \cdot 5H_2O$] to obtain an A solution. Separately, 8 g of sodium carbonate [$Na_2CO_3$] was dissolved in 500 ml of ion-exchanged water at 20° C. to obtain a B solution. To the A solution was slowly added the B solution to obtain a C solution containing an iron compound. This C solution was stirred for 1 hour while the solution was aerated with the air. Thereafter, a temperature of the solution was elevated to 50° C., followed by stirring for 6 hours. The C solution was filtered, washed with ion-exchanged water until the filtrate was neutralized, and dried for 10 hours in the air at 100° C. The resulting catalyst contained an iron compound of $Fe_2O_3$ and $FeO(OH)$, and an iron compound having a spinel type structure of $CuFe_2O_4$, and a Cu element rate was 20 mole %.

Example 3

The catalyst of Example 1 was air-oxidized with the air at 250° C. for 3 hours. The resulting catalyst contained an iron compound of $Fe_2O_3$, and an iron compound having a spinel type structure of $MnFe_2O_4$, and a Cu element rate was 20 mole %.

Example 4

The catalyst of Example 2 was air-oxidized for 3 hours in the air at 250° C. The resulting catalyst contained an iron compound of $Fe_2O_3$, and an iron compound having a spinel type structure of $CuFe_2O_4$, and a Cu element rate was 20 mole %.

Comparative Example 1

In 500 ml of ion-exchanged water at 20° C. was dissolved 5.5 g of iron sulfate [$FeSO_4.7H_2O$] to obtain an A solution. Separately, 8 g of sodium carbonate [$Na_2CO_3$] was dissolved in 500 ml of ion-exchanged water at 20° C. to obtain a B solution. To the A solution was slowly added the B solution to obtain a C solution containing an iron compound. This C solution was stirred for 1 hour while the solution was aerated with the air. Thereafter, a temperature of the solution was elevated to 50° C. followed by stirring for 6 hours. The C solution was filtered, washed with ion-exchanged water until the filtrate was neutralized, and dried for 10 hours in the air at 100° C. The resulting catalyst was an iron compound of $Fe_2O_3$ and $FeO(OH)$.

Comparative Example 2

The catalyst of Comparative Example 1 was air-oxidized for 3 hours in the air at 250° C. The resulting catalyst was an iron compound of $Fe_2O_3$.

Regarding Examples 1 to 3, it is seen that an initial ozone removal rate, and an ozone removal rate after 60 hours are high, and deterioration with time is small. On the other hand, regarding Comparative Examples 1 to 2, it is seen that, with respect to ozone removal rate, the catalyst is of low performance capability from an initial stage.

TABLE 1

|  | Ozone removal rate (%) | |
| --- | --- | --- |
|  | Initial | After 60 hours |
| Example 1 | 90 | 87 |
| Example 2 | 82 | 80 |
| Example 3 | 92 | 90 |
| Example 4 | 85 | 84 |
| Comparative Example 1 | 20 | 15 |
| Comparative Example 2 | 23 | 15 |

The ozone-decomposing agent of the present invention can maintain a high efficacy from an initial stage and over a long term, can be utilized in the field of wide ozone-decomposing removal, and can greatly contribute to the industrial field.

While this invention has been described with an emphasis upon preferred embodiments, it will be understood by those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

The invention claimed is:

1. An ozone-decomposing agent, comprising:
   a first iron compound and a second iron compound, wherein the first iron compound comprises at least one selected from the group consisting of $Fe_2O_3$, $FeO(OH)$ and $Fe(OH)_3$ and the second iron compound has a spinel type structure.

2. The ozone-decomposing agent according to claim 1, wherein the second iron compound comprises at least one selected from the group consisting of $MnFe_2O_4$, $ZnFe_2O_4$, $NiFe_2O_4$, $CuFe_2O_4$ and $CoFe_2O_4$.

3. The ozone-decomposing agent according to claim 2, wherein the first iron compound and the second iron compound were obtained by reacting precursors for the first iron compound and the second iron compound to form a reaction mixture and co-precipitating the first iron compound and the second iron compound from the reaction mixture.

4. The ozone-decomposing agent according to claim 2, wherein an ozone removal rate of the agent measured by subjecting a 0.1 g sample of the agent to air containing 8 ppm ozone at a flow rate of 2 L/min in a glass column of an inner diameter of 12.5 mm at a temperature of 25° C. and a relative humidity of 50% and calculated by the equation, removal rate(%)=[1−(ozone outlet concentration)/ (ozone inlet concentration)×100], is 80% or greater after 60 hours of testing.

5. A filter for decomposing ozone, comprising:
   a substrate; and
   a filter layer on a substrate, the filter layer comprising an ozone-decomposing agent,
   wherein the ozone-decomposing agent has a first iron compound and a second iron compound, the first iron compound comprises at least one oxide selected from the group consisting of $Fe_2O_3$, $FeO(OH)$ and $Fe(OH)_3$, and the second iron compound comprises at least one oxide selected from the group consisting of $MnFe_2O_4$, $ZnFe_2O_4$, $NiFe_2O_4$, $CuFe_2O_4$ and $CoFe_2O_4$.

* * * * *